(12) United States Patent
Muehl et al.

(10) Patent No.: US 7,093,756 B2
(45) Date of Patent: Aug. 22, 2006

(54) DISTRIBUTED PRODUCTION CONTROL

(75) Inventors: Gordon Muehl, Oestringen (DE); Klaus Irle, Walldorf (DE); Walter G. Kienle, St. Leon-Rot (DE); Knut Heusermann, Rauenberg (DE)

(73) Assignee: SAP Aktiengesellschaft, Waildorf (DE)

( * ) Notice: Subject to any disclaimer, the term of this patent is extended or adjusted under 35 U.S.C. 154(b) by 20 days.

(21) Appl. No.: 10/285,316

(22) Filed: Oct. 31, 2002

(65) Prior Publication Data

US 2004/0084520 A1    May 6, 2004

(51) Int. Cl.
*G06K 7/08* (2006.01)
(52) U.S. Cl. ..................................... 235/451
(58) Field of Classification Search ............... 235/451, 235/462.01, 462.13, 375, 376, 435, 438, 235/462.12, 470
See application file for complete search history.

(56) References Cited

U.S. PATENT DOCUMENTS

| | | | |
|---|---|---|---|
| 5,249,131 A * | 9/1993 | Kato | 700/217 |
| 5,321,619 A | 6/1994 | Matsuda et al. | 364/468 |
| 5,347,463 A | 9/1994 | Nakamura et al. | 364/478 |
| 5,434,790 A * | 7/1995 | Saka et al. | 700/110 |
| 5,459,304 A | 10/1995 | Eisenmann | |
| 5,475,797 A * | 12/1995 | Glaspy et al. | 700/247 |
| 5,793,027 A | 8/1998 | Balk | |
| 5,864,784 A | 1/1999 | Brayton et al. | |
| 5,910,776 A | 6/1999 | Black | |
| 6,006,171 A | 12/1999 | Vines et al. | |
| 6,073,062 A | 6/2000 | Hoshino et al. | |
| 6,112,152 A | 8/2000 | Tuttle | |
| 6,223,137 B1 | 4/2001 | McCay et al. | |
| 6,289,292 B1 * | 9/2001 | Charlton et al. | 702/108 |
| 6,294,114 B1 | 9/2001 | Muirhead | |
| 6,321,983 B1 | 11/2001 | Katayanagi et al. | |
| 6,417,760 B1 | 7/2002 | Mabuchi et al. | |
| 6,557,752 B1 | 5/2003 | Yacoob | |
| 6,568,436 B1 | 5/2003 | Matthews et al. | |
| 6,574,518 B1 | 6/2003 | Loonsberry et al. | |
| 6,585,009 B1 | 7/2003 | Matthews et al. | |
| 6,616,034 B1 | 9/2003 | Wu et al. | |
| 6,661,339 B1 | 12/2003 | Muirhead | |
| 6,671,646 B1 | 12/2003 | Manegold et al. | |
| 6,718,888 B1 | 4/2004 | Muirhead | |
| 6,749,418 B1 | 6/2004 | Muirhead | |
| 6,819,986 B1 | 11/2004 | Hong et al. | |
| 6,859,757 B1 | 2/2005 | Muehl et al. | |
| 6,943,678 B1 | 9/2005 | Muirhead | |
| 2001/0047283 A1 | 11/2001 | Melick et al. | |
| 2002/0059075 A1 | 5/2002 | Schick et al. | |
| 2002/0123933 A1 | 9/2002 | Himes | |

(Continued)

FOREIGN PATENT DOCUMENTS

DE    4415763    11/1995

(Continued)

OTHER PUBLICATIONS

PCT International Search Report for PCT/EP 03/12185 filed Oct. 31, 2003.

*Primary Examiner*—Steven S. Paik
(74) *Attorney, Agent, or Firm*—Fish & Richardson P.C.

(57) ABSTRACT

Techniques for distributed production control include tagging unfinished products with electronically accessible production information that identifies aspects in which the products are to be produced differently. The production information is used to control an aspect of the production of a given product.

26 Claims, 4 Drawing Sheets

U.S. PATENT DOCUMENTS

| | | |
|---|---|---|
| 2002/0167393 A1 | 11/2002 | Mabuchi et al. |
| 2002/0195503 A1 | 12/2002 | Allen et al. |
| 2003/0061005 A1 | 3/2003 | Manegold et al. |
| 2003/0069648 A1 | 4/2003 | Douglas et al. |
| 2003/0069673 A1 | 4/2003 | Hong et al. |
| 2003/0095038 A1 | 5/2003 | Dix |
| 2003/0102970 A1 | 6/2003 | Creel et al. |
| 2003/0120501 A1 | 6/2003 | Peters et al. |
| 2004/0168618 A1 | 9/2004 | Muirhead |
| 2005/0237184 A1 | 10/2005 | Muirhead |
| 2005/0241548 A1 | 11/2005 | Muirhead |

FOREIGN PATENT DOCUMENTS

| | | |
|---|---|---|
| GB | 2 282 628 | 4/1995 |
| GB | 2 352 838 | 2/2001 |
| WO | WO 01/82009 A2 | 11/2001 |

\* cited by examiner

DISTRIBUTED PRODUCTION CONTROL

TECHNICAL FIELD

This disclosure relates to distributed production control.

BACKGROUND

Modern production line systems are capable of fabricating customized products having characteristics based on specifications provided by a party such as a customer. These systems may track the products during the production process to ensure that the products receive the proper characteristics. For example, a customer may place an order for an automobile having certain characteristics such as a red interior, a blue exterior, and a manual transmission. During the production of the custom automobile, the manufacturer must ensure that the automobile receives the exact characteristics specified by the customer. These systems may require maintaining a centralized database for tracking the product during the production process and confirm that the product receives the proper characteristics.

SUMMARY

The present invention provides techniques for distributed production control that includes tagging products with production information specifying components and processes to be applied to the product. During the production process, the production information is read from the product and is used to control the production of the product including the application of the specified components and processes.

In general, in one aspect, the invention features techniques for tagging unfinished products with electronic accessible production information that identifies aspects in which the products are to be produced differently. The production information is used to control an aspect of the production of a given product.

Aspects of the invention can be implemented to include one or more of the following advantageous features. The aspects in which the products are to be produced differently may comprise characteristics of parts to be incorporated into the products. The aspects in which the products are to be produced differently may comprise characteristics of process steps to be applied to the products. Tagging may comprise associating an object containing the information with each of the unfinished products.

The techniques also may include verifying that each of the products have been produced according to the production information. Verifying may include comparing the production information with information representing results of the production of the products. The techniques also may control whether the production of an unfinished product continues based on whether a component specified in the production information is available.

The production information may be carried by a radio-frequency identification tag, an optical memory card, a barcode, or a smart card having a processor and memory. Production information may specify how some portion of a product is to be processed, and specify manufacturing resources used to incorporate components into the products. Production information may be updated to indicate whether a process has been incorporated in the products and updated to indicate whether a component has been applied to the products. A main component of a product may be tagged with production information specifying components to be incorporated in the product during production. A component may be tagged with production information specifying how it is to be incorporated into the product. Production can occur on a mass production line.

In another aspect, the invention features an article of manufacture that includes an unfinished product tagged with electronic accessible production information that identifies aspects in which the products are to be produced differently. The production information is used to control an aspect of the production during production of a given product.

In yet another aspect, the invention features a production system having a production line that includes equipment to read and act on electronic accessible production information carried by unfinished products. The production information identifies aspects in which the products are to be produced differently. The production information is used to control an aspect of the production during production of each of the products.

The invention can be implemented to realize one or more of the following advantages. Current production line systems may include a central system with several subsystems for controlling the material flow and for loading robots with programs for executing a central production plan. The central production plan may include a list of the components and processes that are to be applied to the product during the production process. However, if a particular component or process is not available in the material flow during the production process, the production plan may have to be changed to reflect the missing component. These changes may also have to be communicated to the subsystems. To reduce any possible production delays, the manufacturer may have to include large material buffers and/or time buffers in the material procurement process. Such measures may make the production of customized products costly and inflexible. The current invention may overcome many of these problems.

Product units requiring customized characteristics or features can be produced by tagging a main component and/or other components with electronically accessible production information. The product information can be used to control the production of the product in a self-regulating or distributed manner without having to resort to a central database to interpret the information. As a result, it may no longer be necessary to have a central computer determine the whole list of product units and the characteristics of each and then to send the list to a production line computer for fabrication. Carrying production information on the product may permit an increase in product variety without an increase in production complexity. In addition, the production information can be updated with information reflecting as-built information such as serial number or lot numbers of components, production conditions (e.g., temperature and pressure), identifiers of production resource tools used to fabricate the product (ISO 9000 requirement). Furthermore, correlation between the desired characteristics and the actual characteristics can be automatically confirmed by a remote system that need not access a central database.

Moreover, the techniques disclosed herein may help reduce possible production delays due to required components that are missing during production. If a product contains a main component specifying a component that is not available during the production process, the product can be removed from the production line. The production process can continue processing subsequent products without having to wait for the arrival of the missing component. A missing component in a material flow may no longer cause production delays by requiring changes in a central production plan and communicating these changes to a production line subsystem. In addition, the techniques may reduce the need to have large material buffers or time buffers in material procurement. As a result, the cost of producing customized products may be reduced.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1A:
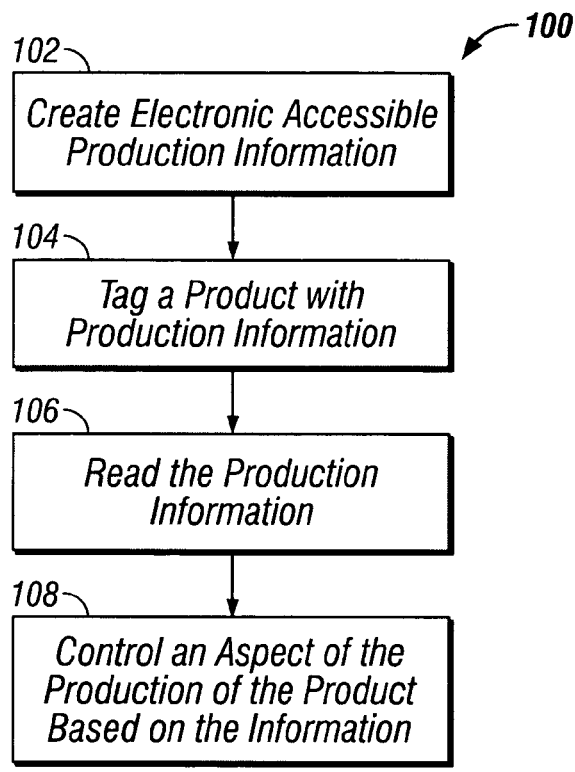
FIGS. 1A and 1B show a method and system for producing products.

FIG. 1A shows a method 100 for producing products. Electronic accessible production information is created (block 102) that identifies aspects in which a customized product is to be produced. The product is tagged (block 104) with the production information. During the production process, readers capable of recognizing the production information read (block 106) the production information. The production information is used to control (block 108) an aspect of the production of each of the products. For example, a consumer may wish to order an automobile with an automatic transmission. An automobile manufacturer may tag some portion of the automobile with production information specifying an automatic transmission. During the manufacturing process, a device capable of reading the production information, such as a tag reader, reads the stored production information. In response to the production information, an automatic transmission is retrieved and attached to the automobile, thus improving the manufacturing process while satisfying the consumer's request for a customized product.

Figure 1B:
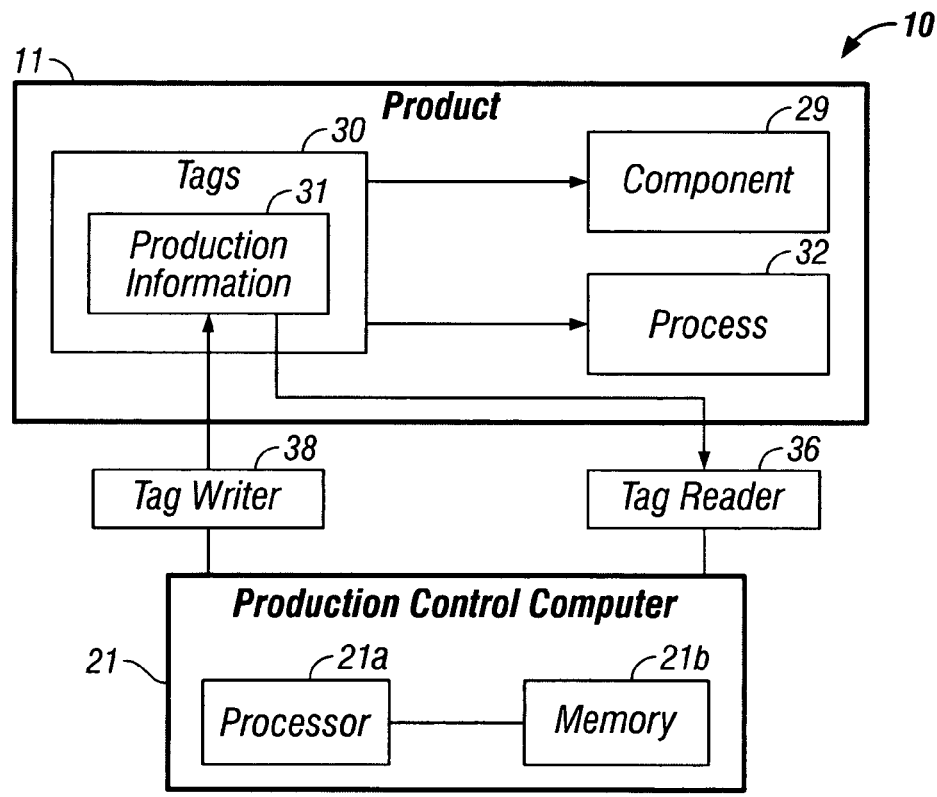

FIG. 1B shows a system 10 for producing products. The system 10 includes a production control computer 21 having one or more processors 21a and memory 21b configured to produce units of a product 11 based on specifications for the respective units. The specifications can be used to create production information 31 written to a tag 30 using a device capable of writing the information such as tag writer 38. The tag 30 is attached to the product 11. The production information 31 specifies components 29 as well as processes 32 to be applied to the product 11 during the production process. The components 29 that are to be applied or that are to become part of the unit of the product can also be marked with tags. The components 29 that are marked may include one or more main components or subcomponents and one or more components that are to be added to the main components to become part of the unit of the product. A main component can refer to an "anchor" component that includes subcomponent that make up the main component. The units of a main component of the product can be marked with a tag having electronically accessible production information that includes a list of the components and processes that are to be applied to the units during the production process. The list may also describe the manner in which the processes are to be applied and the locations in which the processes are to be applied. Other components can be marked with tags that identify the components or list characteristics of the components. The tagged main components and tagged other components can then be made available for use on a production system.

During the production process, the computer 21 controls the production steps of the production line on which the product 11 is being produced. The production of product 11 is based on the production information 31 read from the tags 30 on the units of the main component of the product 11, for example, as it proceeds along the production line, and from the tags on the units of the other components, if any. The production information 31 is read from the tag 30 using a device capable of reading the information such as tag reader 36. Components 29 and/or processes 32 specified by the production information 31 can then be applied to product 11. As a result, the production system produces products, each being subjected to one or more customized processes and containing a custom set of components all based on product specification information (i.e. customized specification information) carried on the product. This information may include custom processes and/or custom configurations.

Although we have referred to information carried on tags, we use the word tags to include any marking of the components either directly on the components, by painting, marking, etching, or another process, or by applying another object, such as a label or a microchip or a tag to the components. Also, although the phrase "specifications" refers to customer specifications, specifications can include specifications provided by any party, a manufacturer, a supplier, or a joint venturer, or others.

Figure 2:
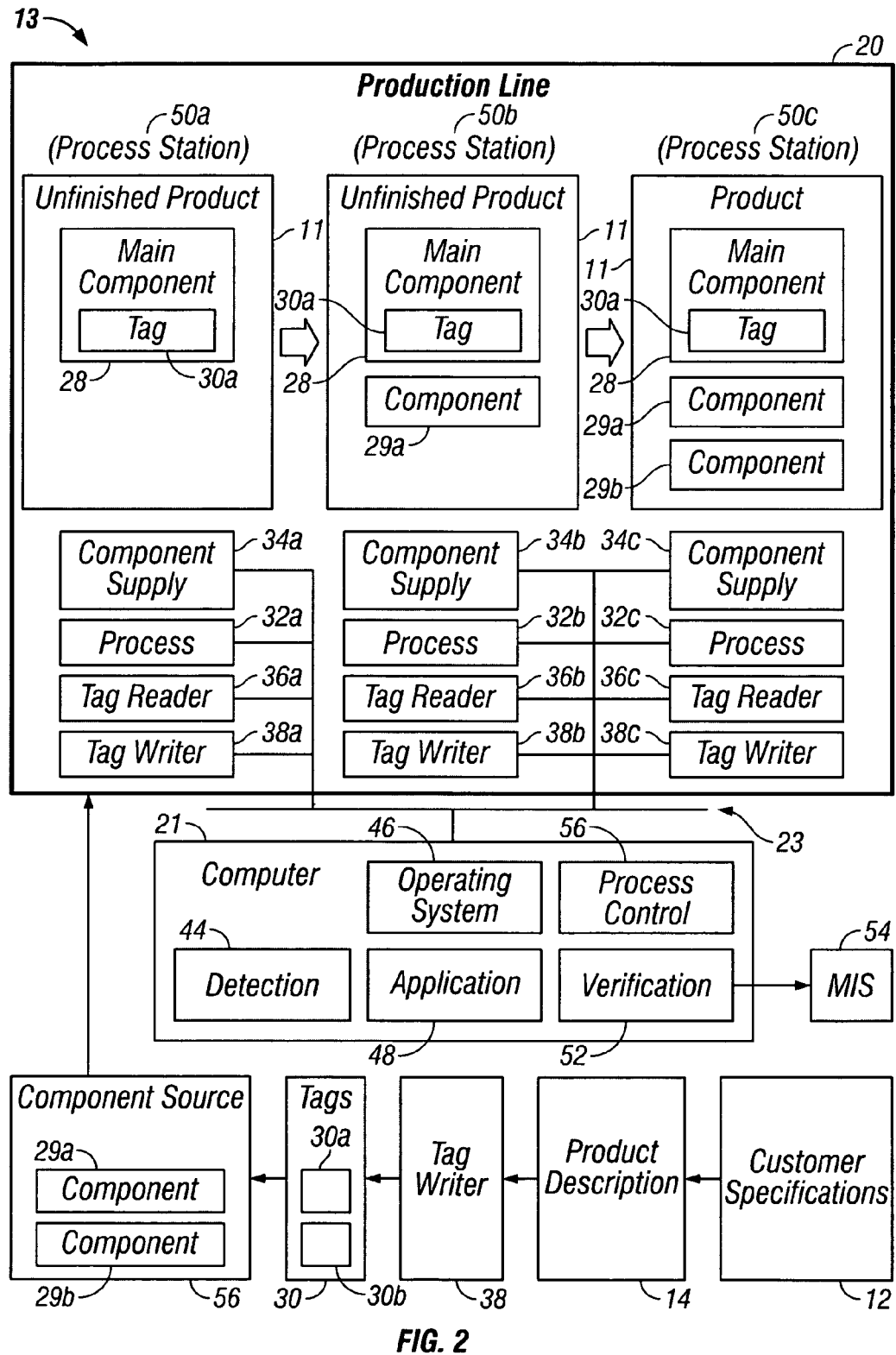
FIG. 2 shows a control system for producing products.

FIG. 2 is a detailed diagram of production control system 13. The system 13 receives customer specifications 12 for a product 11. The customer specifications 12 can be used to create production description information 14 specifying components and processes to be applied with respect to one or more units of product 11 during the production process. A tag writer 38 uses the production specification information to create two types of tags 30: one or more main component tags 30a and one or more other component tags 30b. The main component tags 30a are affixed to the main component 28 of the product and contain a list of components and processes that are to be applied to the product 11 during the production process. The other component tags 30b are affixed to a component 29 that is to be applied to or incorporated with the product 11 during the production process. Examples of tags 30 are described below. Components, such as 29a and 29b, are available from a component source 56 such as an inventory system. (The tagged main component and the tagged other components are then distributed to the production line 20 in preparation for the production process.

The production line 20 is connected to a computer 21 that includes a process control module 56 for executing process steps for processing a product. Each process step is associated with a process station 50a, 50b, 50c where one or more aspects of the product are processed. The process stations 50a, 50b, 50c process a product by applying to the product components from a component supply 34a, 34b, 34c and processes from a process module 32a, 32b, 32c. A tag reader 36a, 36b, 36c reads production information from a tag 30a on the product 11 and a tag writer 38a, 38b, 38c writes production information to the tag on the product. Although this example shows a production line 20 having three process stations, a production line having a different process station configuration can be used with the techniques disclosed herein.

The component supply 34 holds the tagged components 29a, 29b that are to be applied to the product 11. The process module 32 includes one or more machines for applying a manufacturing process (e.g., apply paint to a car interior, or installing a display panel on a notebook computer) to the product 11. The tag reader 36 may read product information from both the main component tags 30a and the other component tags 30b. The production information can be used to retrieve the specified component from the component supply 34. The production information can be used to control the production of the product by specifying the component 29a, 29b and/or process 32 that is to be applied to the product 11 and also to control the manner in which the process is applied (for example, the temperature at which a paint is cured). The tag writer 38 can be used to update the main component tag 30a to indicate that the required component 29 and/or process 32 has been applied to the product.

The computer 21 can be connected to the production line 20 using a network 23 such as an Ethernet network. The computer 21 can also be connected to a management information system (MIS) 54 such as an enterprise resource program (ERP) for reporting the information related to the production process. The computer 21 includes hardware and software modules for monitoring and controlling the production line. The hardware can include memory for storing data and programs, a display screen for displaying data from the computer, an input device such as a keyboard for entering data into the computer, communications means for communicating over the network 23, and other hardware.

In some examples, the computer 21 can include a detection module 44, an operating system 46, an application program 48, a process control module 56, and a verification module 52. The detection module 44 includes software instructions for detecting the occurrence of the different process steps during the production process. The operating system 46 can include a program responsible for the overall operation of computer 21. The application module 48 can include applications such as word processors, spreadsheets, database programs, supply chain management (SCM) programs, and other applications. The process control module 56 can includes instructions for controlling the overall operation of the production line including the process steps for the production of a product 11. The verification module 52 includes instructions for processing data from the tag reader and writer 36, 38 to determine whether the required components and processes have been applied to the product according the customer specifications 12. The verification module 52 communicates verification information to the MIS system 54 which can be used to generate reports indicating the status of the production process.

Figure 3A:
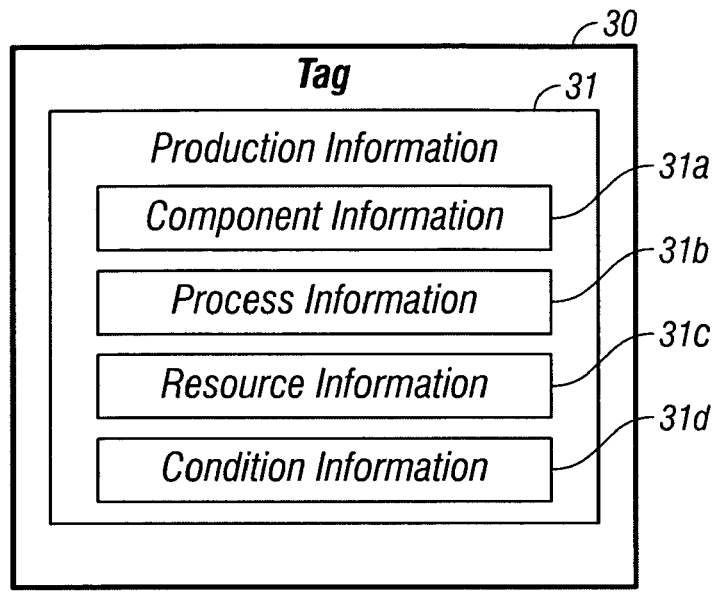
FIGS. 3A through 3C show a tag for carrying production information.

FIG. 3A illustrates a tag 30 for carrying production information. The tag includes production information 31 such as component information 31a, process information 31b, resource information 31c, and condition information 31d. Other information can be included as well. The component information 31a specifies a component that is to the incorporated into the product, for example, a dial to be installed on a washing machine. A globally unique identifier (GUID) can be used to identify the component by product number/name. Also, information can be included that specifies how some portion of the product is to be handled. For example, information about how an automobile interior is to be handled can be carried on one of the interior components. Information also can be marked on individual components to show the destination of a component to a product. For example, a steering wheel can be marked with a tag indicating that it is to be incorporated with an automobile having a particular customization code.

The process information 31b specifies a process that is to be applied to the product, for example, running an electric motor while testing the electrical characteristics of the motor. Resource information 31c can be updated with information during the production process to indicate resources that were used to apply a particular process to the product. For example, the information about a resource can include an identification number of a robot arm for applying paint to an automobile. The Resource information may be helpful in identifying products produced by defective tools. Such information may be useful for ISO 9000 compliance. Similarly, Condition information 31d can be updated with information reflecting a condition associated with a process that was applied to the product (e.g. temperature of the applied paint, the pressure applied by a rivet tool). Other information can include serial or lot numbers associated with the source location of the main component 28, components 29a, 29b, and the product 11. The tag 30 can be implemented using electronically accessible techniques such as a radio-frequency identification (RFID) tag, an optical memory card, a barcode, a smart card having a processor and memory, or other techniques.

Figure 3B:
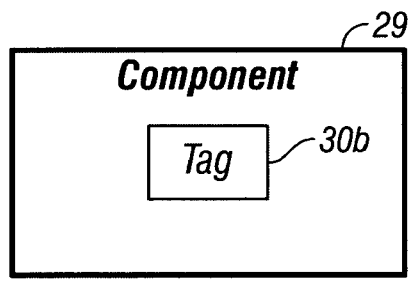
Figure 3C:
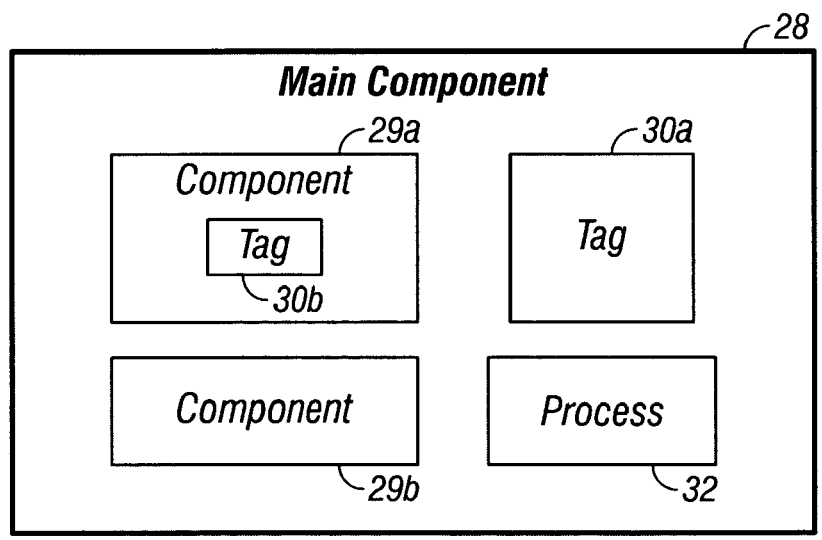

FIGS. 3B and 3C show a tag 30 for carrying production information. Referring to FIG. 3B, a component tag 30b can be applied to a component 29. The component tag 30b can include production information such as how the component is to be processed. For example, in an automobile production line, the component can be a steering wheel that includes a tag having production information specifying that it is to be attached to an automobile that is being built according to a particular customization code. The component tag 30b also can include production information specifying how the component is to be processed. For example, the component tag 30b can include information specifying that the steering wheel is to be painted red.

Referring to FIG. 3C, a main component 28 can include a main component tag 30a that contains a list of characteristics. Such characteristics can include, for example, components and processes, that can be applied to the main component 28. The information included in the main component tag 30a specifies a component 29a having a component tag 30b, another component 29b without a component tag, and a process 32. For example, the main component 28 can represent an automobile and the main component tag 30a can be applied to a frame of the automobile. The main component tag 30a can specify a manual transmission represented by component 29a. The component 29a has a component tag 30b that can specify that the manual transmission is to be incorporated into this particular automobile. The main component tag 30a also can specify another component such as CD player that is to be installed into this particular automobile, as represented by component 29b. The main component tag 30a also specifies that a process 32 is to be applied to the automobile such as painting the automobile red using a particular painting machine.

Figure 4:
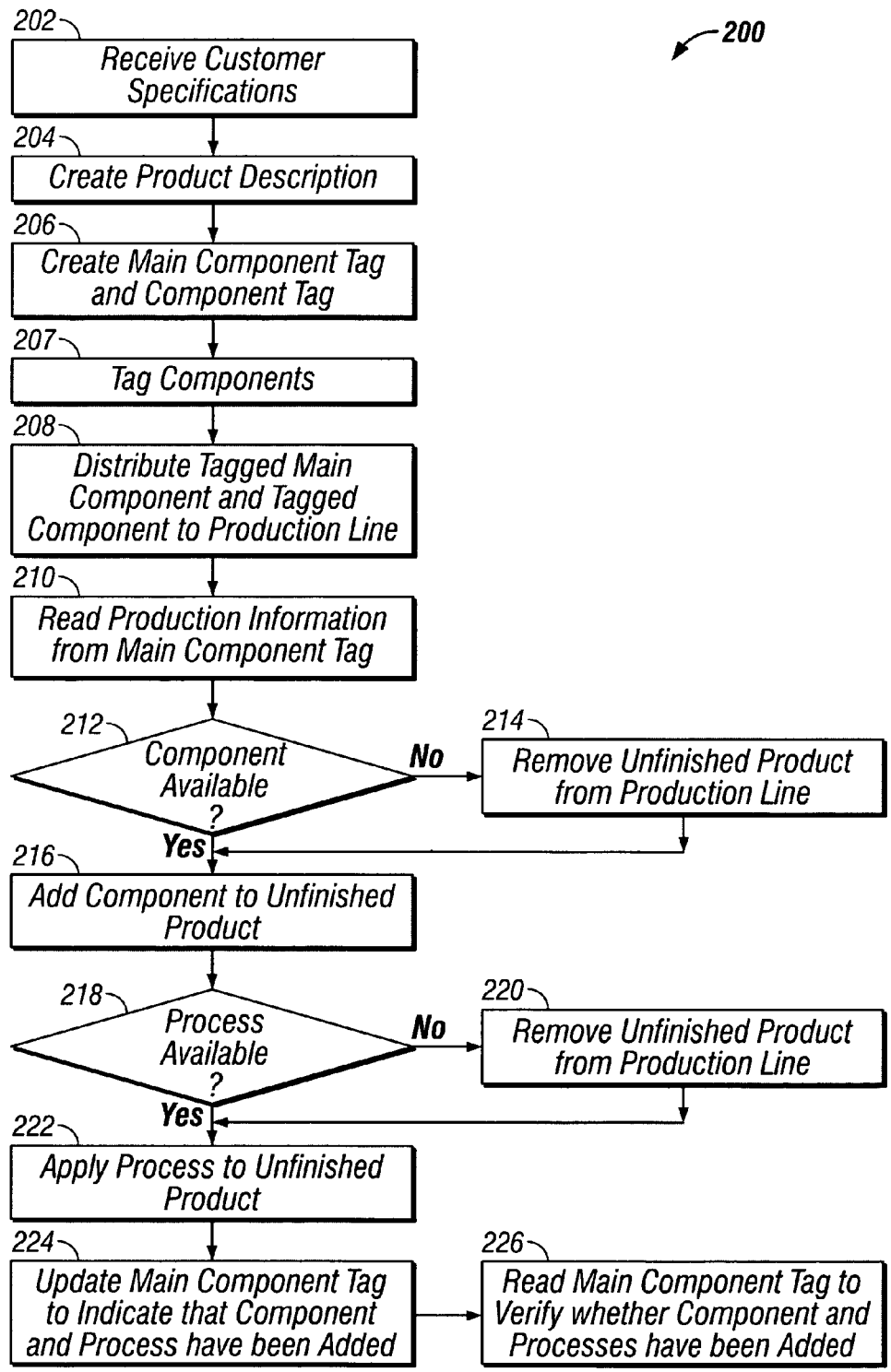
FIG. 4 shows a method for producing products.

FIG. 4 is a flow diagram 200 of a method of producing products. The flow diagram 200 is described in the context of the automobile industry but the method may be applicable in other industries such as the consumer products industry. To illustrate, a customer may request to have an automobile manufactured according to specifications that include characteristics such as a CD player and a red interior. The system 10 (see FIG. 2) receives (block 202) customer specifications 12 to be used to manufacture units of a product 11. In this example, the automobile manufacturer receives specifications from a customer to have an automobile produced with a CD player and a red interior. The system 10 creates (block 204) production description 14 specifying components as well as processes to be applied to the product 11 during the production process. For example, the automobile manufacturer can produce a production description that specifies a component (CD player) and a process (red interior) to be applied to the automobile.

The system 10 can then create (block 206) a main component tag 30*a* and component tag 30*b* corresponding to a main component and the components that are to be incorporated into the product 11. The system tags components (block 207) of product 11. The components that are marked may include one or more main components or main subcomponents and one or more components that are to be added to the main components to become part of the units of the product. The units of a main component of the product can be each marked with a tag having electronically accessible production information that includes a list of the components and processes that are to be applied to the product during the production process. The list may also describe the manner in which the processes are to be applied and the locations in which they components are to be installed. Other components can be marked with tags that identify the components or list characteristics of the components. The tagged main components and tagged other components can then be made available for use on a production line 20. Components such as 29*a*, 29*b* can be retrieved from the component source 56. In this example, a main component tag 30*a* is attached to the automobile and a component tag 30*b* is attached to the CD player. The main component tag 30*a* specifies that the automobile is to have a CD player as well as a red interior.

Once the components have been tagged, the system distributes (block 208) tagged main component 28 and tagged component 29*a* to the production line 20. In this example, the automobile is placed on process station (e.g. 50*a*) in preparation for the production process. The automobile is then advanced to process station (e.g. 50*b*), where a tag reader (e.g. 36*b*) is used to read (block 210) production information from the main component tag (e.g. 30*a*). In this example, the tag reader (e.g. 36*b*) reads from the main component tag (e.g. 30*a*) production information which specifies a CD player.

A determination (block 212) is made as to whether the component is available to be applied to the product 11 during the production process. For example, the system 10 determines whether the CD player is available from the component supply (e.g. 34*b*). If the component is not available, then unfinished product 11 is removed (block 214) from the production line 20. Removing product 11 from the production line may prevent production delays which would otherwise occur if the production line 20 were interrupted while the component is retrieved from inventory or ordered from another manufacturer. On the other hand, if the component is available, it is added (block 216) to the unfinished product 11. In this example, the component (e.g. 29*a*) is a CD player which is retrieved from the component supply (e.g. 34*b*) and applied to the automobile.

The product is advanced to the next process station (e.g. 50*c*) on the production line 20. At this station, the main component tag (e.g. 30*a*) is read and a determination (block 218) is made as to whether a process specified in the main component tag (e.g. 30*a*) is available from the process (e.g. 32*c*). If the process is not available, the unfinished product 11 can be removed (block 220) from production line to prevent production delays in processing other products. Otherwise, if the process is available then the process is applied (block 222) to the unfinished product. In this example, the main component tag (e.g. 30*a*) specifies a process for applying red paint to the interior of the automobile. The red paint is applied using process (e.g. 32*c*) which can be a paint spraying machine. Once the paint has been applied, the main component tag (e.g. 30*a*) can be updated to indicate that the process has been applied. As explained above, the main component tag can be updated with other information such as the model number of the paint machine. Although not specified by the customer specification in this example, the main component can specify another component such as other component 29*b* representing a manual transmission to be added to the automobile during the production process.

The system 10 can update (block 224) the main component tag (e.g. 30*a*) to indicate that component and process specified by the production information have been added. For example, the main component tag (e.g. 30*a*) can be updated to indicate that the CD player was added to the automobile and that the interior of the automobile has been painted red. Any of the tag writers (e.g. 38*a*, 38*b*, 38*c*) can be used to update production information on the main component tag 30*a*. The update process can be performed at the process station where the component or process has been applied or at another process station.

The system reads (block 226) production information from the main component tag (e.g. 30*a*) to verify whether the product 11 has been processed properly. The information may be read using a tag reader (e.g. 36*c*) at process station (e.g. 50*c*) to read the production information from the main component tag (e.g. 30*a*). The production information can be processed by a verification module (e.g. 52) of the computer 21. Such processing can include verifying that components and processes specified by the production information have been applied to the product 11 and are consistent with the customer specifications (e.g. 12). The verification module communicates the verification information to a MIS system (e.g. 54) which can generate reports indicating the status of the production process. In this example, the MIS system can generate a report indicating whether the automobile specified by the customer has been produced according to the customer specifications. This may include a report indicating whether the CD player was added to the automobile and whether the interior of the automobile was painted red.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

A number of embodiments of the invention have been described. Nevertheless, it will be understood that various modifications may be made without departing from the spirit and scope of the invention. For example, the techniques disclosed above can be applied to industries other than the automobile industry such as the consumer products industry and the high-technology industry. The system need not include the computer 21. Each component of the production line can include a processor, memory, and an input device for receiving tag information. Other embodiments include a system for processing only process data, only component data, a combination of both, or a combination of multi-process and multi-component configurations. The flow chart shown in FIG. 3 is only an example of a system that includes one component and one process. It should be understood that other configurations are possible. The tags can also include maintenance information, which can be inserted during the production process. Maintenance information includes maintenance procedures and maintenance history, as well information relating spare parts. The information can specify compatible spare parts, provide a history of parts that have been replaced by spare parts, and provide information about the spare parts that have been installed. The tags can also include security information and implement security features to control access to the tags. Accordingly, other embodiments are within the scope of the following claims.

What is claimed is:

1. A method for producing a customized product comprising:
receiving an unfinished product tagged with a first tag comprising first electronically accessible production information that identifies an aspect of finishing the unfinished product;
receiving an unfinished component of the product, the unfinished component tagged with a second tag comprising second electronically accessible production information that identifies an aspect of finishing the unfinished component;
using the first production information in performing at least a portion of finishing the unfinished product; and
using the second production information in performing at least a portion of finishing the unfinished component of the unfinished product.

2. The method of claim 1, wherein the first tag comprises production information that identifies the unfinished component of the unfinished product.

3. The method of claim 1, wherein the first tag comprises production information that identifies a process to be applied during finishing the unfinished product.

4. The method of claim 3, wherein the production information that identifies the process comprises production information that identifies a manner in which the process is to be applied.

5. The method of claim 1, wherein the second tag comprises production information that identifies a subcomponent of the unfinished component.

6. The method of claim 1, wherein the second tag comprises production information that identifies a process to be applied during finishing the unfinished component.

7. The method of claim 1, wherein the second tag comprises production information that identifies how the unfinished component is to be applied to the unfinished product.

8. The method of claim 1, wherein using the first production information comprises using the first production information to identify a manufacturing resource usable in performing finishing the unfinished product.

9. The method of claim 1, further comprising updating the first production information to reflect performance of the aspect of finishing the unfinished product.

10. The method of claim 1, wherein using the first production information comprises:
identifying that a second component specified in the first production information is unavailable; and
interrupting finishing the unfinished product based on unavailability of the second component.

11. A method for producing a customized product comprising:
receiving an unfinished product comprising a second component, the unfinished product tagged with a first tag comprising first electronically accessible production information that identifies an aspect of finishing the unfinished product, the second component tagged with a second tag comprising second electronically accessible production information that identifies an aspect of finishing the second component;
using the first production information in incorporating a first component into the unfinished product, wherein incorporation of the first component partially completes assembly of the unfinished product;
using the second production information in performing at least a portion of finishing the second component; and
before attempting to complete assembly of the product, updating the first tag to reflect the incorporation of the first component into the product and updating the second tag to reflect the portion of finishing the second component.

12. The method of claim 11, wherein updating the second tag comprises updating the second tag to reflect an application of a process to the second component.

13. The method of claim 11, wherein updating the second tag comprises updating the second tag with at least one of a production condition, as-built information, or an identifier of a production resource tool.

14. The method of claim 11, further comprising associating the first tag with the unfinished product.

15. The method of claim 11, further comprising verifying that finishing the second component has been performed in accordance with the second production information.

16. An article comprising:
an unfinished product comprising an unfinished component,
wherein the unfinished product is tagged with a first tag comprising first electronically accessible production information that identifies an aspect of finishing the unfinished product, the first production information comprising
component information identifying a component to be applied to the unfinished product,
process information, identifying a process to be applied to the unfinished product,
resource information identifying a manufacturing resource usable to perform at least a portion of finishing the unfinished product, and
updated information written at an assembly site, the updated information reflecting an incorporation of the component into the unfinished product before assembly of the unfinished product is completed, and
wherein the unfinished component is tagged with a second tag comprising second electronically accessible production information that identifies an aspect of finishing the unfinished component.

17. The article of claim 16, wherein the first production information further comprises condition information identifying a manner in which the process is to be applied to the unfinished product.

18. The article of claim 16, wherein the first production information further comprises at least one of a production condition, as-built information, or an identifier of a production resource tool.

19. The article of claim 16, wherein the component information comprises information identifying a characteristic of a part to be incorporated into the unfinished product.

20. The article of claim 16, wherein the first tag comprises a radio-frequency identification tag tagging the unfinished product.

21. The article of claim 16, wherein the updated information also reflects a performance of a process in the finishing of the unfinished product.

22. The article of claim 16, wherein the unfinished product further comprises a third component tagged with third electronically accessible production information.

23. The article of claim 22, wherein the third production information comprises information identifying an aspect of finishing the third component.

24. The article of claim 23, wherein the third production information comprises subcomponent information identifying a subcomponent of the third component.

25. The article of claim 23, wherein the third production information comprises second process information identifying a second process to be applied to the third component.

26. The article of claim 23, wherein the third production information comprises second resource information identifying a second manufacturing resource usable to perform the aspect of finishing the third component.

* * * * *